2,964,491
Patented Dec. 13, 1960

2,964,491

HEAT HARDENABLE PHENOLIC RESIN COMPOSITIONS COMPRISING BLENDS OF ALKENYL-PHENOL-ALDEHYDE RESINS AND POLYVINYL-ACETAL RESINS AND METAL BASE COATED THEREWITH

Arthur F. Rylander, Milwaukee, Wis., Henry A. Vogel, Richland Township, Pa., and Robert F. Roach, Milwaukee, Wis., assignors to Pittsburgh Plate Glass Company No Drawing. Filed July 1, 1957, Ser. No. 668,881

7 Claims. (Cl. 260—43)

This invention relates to heat hardenable phenolic resin compositions and pertains more particularly to the modification with polyvinylacetal resins of the resinous materials prepared by the condensation of butenylphenols and aldehydes.

In a series of copending applications, Serial Numbers 300,359, filed July 22, 1952, and 337,226, 337,227, 337,228 (now abandoned), and 337,229 (now abandoned), all filed February 16, 1953, methods for the preparation of alkenylphenols, and particularly the butenylphenols, involving the reaction of phenolic compounds with dienes in the presence of certain Friedel-Crafts catalysts are disclosed. In still other copending applications, Serial Numbers 390,088 and 390,089, both filed November 3, 1953, now U.S. Pat. Nos. 2,843,565 and 2,843,566, respectively, it is disclosed that the alkenylphenols can be condensed with aldehydes, particularly formaldehyde, in the presence of either acidic or basic catalysts to give useful thermosetting phenolic resins. These resins are unusual among phenolic resins in that they cure very fast and are compatible with a large number of modifiers with which other known thermoset phenolics are incompatible. This property of being compatible with a great many modifiers renders the alkenylphenolicaldehyde resins useful in many applications where conventional phenolic-aldehyde resins cannot be employed.

It has now been discovered that the properties of the alkenylphenolic-aldehyde resins can be even further improved by modifying said resins with polyvinylacetal resins which serve as plasticizers. The resulting modified resins form films having many extremely valuable properties including light color, outstanding flexibility, adhesion, impact resistance and resistance to the action of chemicals. Moreover, the polyvinylacetal modified resins cure rapidly and at relatively low temperatures. These properties render the compositions of this invention particularly useful as coatings for the interior of food containers, in which application they overcome the very serious problem of "spangling." The phenomenon known as "spangling" is characterized by a darkening of the coating due to the fact that hydrogen sulfide formed in the food permeates the film and forms tin sulfide with the tin in the metal of the container. Coatings which exhibit appreciable spangling are substantially worthless as food container coatings.

The resins disclosed in the copending applications and which are plasticized with polyvinylacetal resins in accordance with the present invention are prepared by the condensation of alkenylphenols with aldehydes, and particularly formaldehyde. Preferably, the condensation is catalyzed by a basic material, although acid catalyzed condensation products may also be used. Typical alkenylphenols which may be condensed with aldehydes to give useful resins include:

| | |
|---|---|
| o-2-butenylphenol | 2-iodobutenylphenol |
| p-2-butenylphenol | o-Cyclopentenylphenol |
| Di-2-butenylphenol | p-Cyclopentenylphenol |
| Tri-2-butenylphenol | Dicyclopentenylphenol |
| Butenylcresol | Tricyclopentenylphenol |
| Butenylcatechols | Pentenylphenol |
| Butenyl-2,5-dichlorophenol | Pentenylcresol |
| | Pentenylguaiacol |
| Butenyl-2,5-dinitrophenol | Chloropentenylphenol |
| Butenyl-2,3-dimethoxyphenols | Bromopentenylphenol |
| | Chloropentenylguaiacol |
| Butenylresorcinol | Hexenylphenol |
| Dibutenylresorcinol | Hexenylcresol |
| Tributenylresorcinol | Dihexenylcresol |
| Butenylguaiacol | Trihexenylcresol |
| Dibutenylguaiacol | Chlorohexenylphenol |
| Tributenylguaiacol | Chlorohexenylchlorophenol |
| 2-chlorobutenylcresol | |
| 2-chlorobutenylphenol | Chlorohexenylcatechol |

In addition to the above alkenylphenols, other alkenylphenols may also be condensed with aldehydes such as formaldehyde to yield thermosetting resins which can in turn be plasticized with polyvinylacetal resins to produce useful compositions.

In the preparation of alkenylphenols by the processes described in the copending applications mentioned hereinabove, a mixture of alkenylphenols, including about 55 percent to 85 percent of monoalkenylphenols (including ortho- and para-monoalkenylphenols) and about 15 percent to 45 percent of higher boiling phenols, including di- and trialkenylphenols, is generally obtained. Minor quantities of ethers and polyphenols are also formed. In this manner a mixture of mono-, di-, and tributenylphenols is obtained by the reaction of butadiene-1,3 with phenol. Mixtures or butenyl phenols, particularly mono-, di-, and tributenylphenols, are especially preferred since resins prepared therefrom cure very rapidly to give light colored, hard, flexible films which are very resistant to the action of chemicals. Obvious economic advantages also attend the use of a mixture of alkenylphenols since the entire reaction mixture can be utilized, thus obviating the costly and time consuming procedure of first separating the monoalkenylphenols therefrom.

In accordance with the present invention the resins prepared by the condensation of alkenylphenols with aldehydes such as formaldehyde are admixed and plasticized with a polyvinylacetal resin, preferably polyvinylformal or polyvinylbutyral. The term "polyvinylacetal" is used to indicate polyvinyl alcohols which have had a major part of their hydroxyl groups condensed with aldehyde. These materials previously have been used as wire coatings, as interlayers for safety glass and similar uses.

The solubility of the polyvinylacetal resin varies with the hydroxyl and acetate content. However, all are relatively sensitive to water as well as to hydrocarbons. The best solvents are lower alcohols or mixtures of alcohols with aromatic hydrocarbons, Cellosolves, ketones or esters. Polyvinylformals are not soluble in lower alcohols, hydrocarbons, esters and most organic solvents. Among the best solvents for the formals are methylethylketone, dioxane, cyclohexanone, ethylene dichloride, methylene chloride, chloroform, toluene-ethanol (60–40 mixture) and toluene-methanol (75–25 mixture).

One particularly useful polyvinylbutyral resin for use as a plasticizer for the alkenylphenol-aldehyde resins in accordance with this invention has a vinyl alcohol content of 18.2 percent, an $\eta i$ in cyclohexanone at 20° C. of 0.81 and a specific gravity of 1.03, while a useful polyvinylformal resin has a specific gravity of 1.23, a refractive index of 1.50 and a tensile strength of 10,000 pounds per square inch. Other polyvinylacetal resins may also be used.

The quantity of the polyvinylacetal resin utilized may be varied considerably. For example, amounts as low as 10 percent by weight of the polyvinylacetal resin, based on the weight of the alkenylphenol-aldehyde resin solids impart improved properties to the resin compositions, while amounts as large as about 35 percent on the same weight basis may be utilized if desired. It has been found that the optimum amount of the acetal resin is about 10 percent to 20 percent by weight. Compositions containing such amounts of polyvinylacetals cure to give flexible, light colored films suitable for sanitary liner applications on tin plate or black iron plate or for other uses in only 15 minutes at 350° F. or 10 minutes at 375° F. On the other hand, other phenolic resins, such as those disclosed in U.S. Patent No. 2,006,043, require several hours at about 300° F. to cure to a hard film.

Compatibility of the alkenylphenol-aldehyde resins with polyvinylbutyral resins, although quite good, can be improved by reacting the phenolic resin with an alcohol such as butanol or 2-ethyl hexanol. This alcoholation process is disclosed in co-pending application, Serial No. 427,386, filed May 3, 1954, now U.S. Patent 2,907,751.

The alkenylphenol-aldehyde resin may be blended with the polyvinylacetal resin in any convenient manner. One preferred method, especially when polyvinylbutyral is used as the plasticizer, consists in making up the phenolic resin into a solution of from 40 percent to 50 percent solids content in butanol or xylene, or a mixture of the two. A minor amount of a higher boiling active solvent of the butyl Cellosolve or higher ketone type may be added. To the solution thus prepared, a solution of polyvinylbutyral resin containing from 10 percent to 12 percent solids in a mixture of butanol and xylene, is added. Higher solids solutions of the butyral resin tend to be viscous and gelatinous and difficult to handle. The two solutions are blended with the aid of any convenient agitation equipment. Generally the butyral resin solution is added to the phenolic resin solution because of the higher viscosity of the butyral solution, although the reverse method of addition may be utilized if desired. A typical alkenylphenol-polyvinylbutyral blend may be prepared as follows:

*Solution A*

50 parts phenolic resin
50 parts butanol, xylene and butyl Cellosolve

*Solution B*

10 parts butyral resin
90 parts butanol and xylene

One hundred parts of Solution A and 100 parts of Solution B are blended to get a solution of approximately 30 percent solids with the resins being composed of 17 percent polyvinylbutyral and 83 percent of alkenylphenol-aldehyde resin. By adjusting the quantity of solvent utilized, a solution can be obtained having any solids content needed for a particular application such as in can liner coating compositions.

Quantities of other plasticizing materials may be utilized in conjunction with the polyvinylacetal resin to produce useful variations in the alkenylphenol-aldehyde resin composition. Included among such other materials are varnishes, alkyd resins, epoxy resins, copolymers in which one component is a vinyl monomer such as styrene, vinyl acetate, vinyl chloride, or the like. Such secondary modifiers may be used in small quantities with regard to the amount of polyvinylacetal resin, in equal amounts with said polyvinylacetal resin, or in excess of the quantity of polyvinylacetal resin employed, the quantity utilized being limited by the mutual compatibility of the two plasticizers in each other and in the phenolic resin.

Compositions comprising alkenylphenol-aldehyde resins plasticized with polyvinylacetal resins may be applied to metals, glass and other surfaces to produce clear, light colored films of any desired thickness. Best results are obtained from thin films of about 16 milligrams per square inches (dry film weight). These films adhere unusually well to the surface to which they are applied and stand strong impacts and bending. Also, the films may be subjected to severe processing such as is required in the preserving of food products, particularly meat products. The compositions of this invention are conveniently applied to metallic or other surfaces by roller coating techniques. For this purpose a Gardner viscosity of C to D or 36 to 38 seconds (No. 2 Zahn) is preferred with the plasticized alkenylphenol-aldehyde resin solutions. These viscosities can be achieved by the use of a butanol-xylol solvent mixture. Phenolic type resins such as methylol phenol ethers, specifically 1-allyloxy-2,4,6-tris(hydroxy-methyl) benzene and heat-reactive formaldehyde condensation resins based upon phenol or substituted saturated phenols permit only limited dilution with xylol. One solvent mixture which gives good roller coating flow to alkenylphenol-aldehyde resins plasticized with polyvinylbutyral is composed of 50 percent by weight of butanol, 40 percent by weight of xylol and 10 percent by weight of butyl Cellosolve.

Curing of the resin compositions can be accelerated by addition of certain acidic materials such as phosphoric acid, oxalic acid, sulfanilic acid, p-toluenesulfonic acid, and the like, although the use of such material tends to decrease the flexibility of the resulting film.

The following examples illustrate in greater detail the preparation of resins by the condensation of alkenylphenols with aldehydes, and the plasticization of the resulting resins with polyvinylacetals. The examples are not intended to limit the invention, however, for there are, of course, numerous possible variations and modifications.

EXAMPLE I

One hundred forty-eight parts of a mixture of monobutenylphenols (o- and p-monobutenyphenols) and 10 parts of sodium hydroxide in 100 parts of water were mixed under a nitrogen atmosphere with sufficient cooling to keep the temperature below 35° C. When a homogeneous solution was obtained, 162 parts of 37 percent formalin, methanol-free, containing 60 grams (2 moles) of solid formaldehyde, were added at a moderate rate and cooling was applied to keep the temperature below 35° C. Stirring was continued for 48 hours at room temperature. At the end of this time the reaction mixture was acidified to a pH of 5.0 with a mixture of concentrated hydrochloric acid and water (50 percent acid and 50 percent water), and the resulting water insoluble layer of the resin was washed four times with lukewarm water. The resin was then dehydrated by vacuum stripping at steam temperatures under 20 to 50 mm. pressure for 2 to 4 hours. The yield, based on the quantity of alkenylphenols utilized, was 120 percent, the viscosity at 25° C. was W to Z (Gardner-Holdt), and the resulting resin was completely miscible with ethanol, butanol, toluene and xylene. The resin thus prepared gave a hard film on baking for only 30 minutes at about 150° C.

EXAMPLE II

One hundred forty-eight grams of a mixture of butenylphenols (including monobutenylphenols, dibutenylphenols and tributenylphenols) were admixed with 162 grams of 37 percent formalin. Ammonium hydroxide (aqueous) was added in an amount to adjust the pH of the mixture to 10.5. The resulting mixture was then stirred for 48 hours at 25° C. The reaction mixture was then allowed to stand after which the water layer was decanted. The remaining reaction mixture was then vacuum distilled to remove excess water and ammonium hydroxide. A resin having a viscosity of $Z_5$ to $Z_6$ was obtained.

EXAMPLE III

Two moles of a mixture of butenylphenols, including monobutenylphenols, dibutenylphenols and tributenylphenols, were admixed with 1 mole of formalin in the presence of concentrated hydrochloric acid. The resulting mixture was maintained at 25° C. for about 48 hours. The water layer was then drawn off and the remaining reaction mixture was distilled at reduced pressure until a viscosity of $Z_2$ to $Z_3$ was obtained.

EXAMPLE IV

Example I is repeated except that three runs were made, utilizing furfural, crotonaldehyde and acetaldehyde respectively as the aldehyde. In each instance a resinous condensation product suitable for forming films was obtained. Other aldehydes containing only atoms of carbon, hydrogen, and oxygen, may also be utilized.

EXAMPLE V

The following materials were charged into a glasslined reactor:

24.6 pounds mixed butenylphenols (monobutenylphenols, di- and tributenylphenols)
27.0 pounds formalin solution (37 percent formaldehyde)
1.75 pounds sodium hydroxide
1.7 pounds water
0.12 pound sodium hydrosulfite The resulting mixture was cooled to about 75° F. to 80° F. and the reaction mixture agitated for 5 hours after which it was allowed to stand for an additional 43 hours. The reaction mixture was then acidified to a pH of 5.0 with 68 percent sulfuric acid, and allowed to stand until a water layer settled out. The water layer was then drawn off and discarded. The wet resin (36.25 pounds) was treated with 0.04 pound of an aminotetracarboxylic acid known commercially as Sequestrene AA. The resin was then heated to 220° F. and stripped with an inert gas until a Gardner viscosity of W at 75 percent solids in n-butanol was reached. The resin was then thinned with 10 pounds of n-butanol and filtered at 110° F. The product thus obtained had the following properties:

Weight per gallon _____ 8.45 pounds.
Solids _____ 66.2 percent at 110° C.
Viscosity _____ Q to R (Gardner).

EXAMPLE VI

A butenylphenol-formaldehyde resin was prepared from mixed butenylphenols by the method of Example V. The resin solution consisted of 70 percent uncured butenylphenol-formaldehyde resin and 30 percent n-butanol. It had a viscosity of Q and a color of 8 (Gardner). Its percent resin solids when the butanol was removed at 110° C. was found to be 67 percent, the drop from 70 percent to 67 percent solids representing weight loss of the phenolic resin in the cure which the resin undergoes at that temperature. Similarly, a small sample heated to 400° F. for 10 minutes contains approximately 63 percent solids. At this point the resin is essentially completely cured.

In the present example, as in all of the following examples, the parts are by weight and the amount of plasticizer used is based upon its percent by weight in the cured film, for example, a 17 percent plasticizer content means a cured film containing 83 percent cured phenolic resin solids and 17 percent of original butyral resin solids.

The above alkenylphenolic resin solution was plasticized in the following manner:

Solution A 12.4 parts polyvinylbutyral resin
43.8 parts butanol
43.8 parts xylene
_____
100.0 parts solution at 12.4 percent solids

Solution B 95 parts alkenylphenolic resin (63 percent solids content)
30 parts butanol
_____
125 parts solution at 48 percent solids (cured resin)

Solution C 30 parts butyl Cellosolve
30 parts xylene
_____
60 parts solvent

In blending Solution A was added to Solution B with agitation and Solution C was added last. Depending upon required conditions for roller coating or other application techniques, all or a part of mixture C may be added. When all of the solvent was utilized the final mixture had a viscosity of about 38 seconds in a No. 2 Zahn cup and was suitable for roller coating application. This solution contained 92.4 parts cured resin solids (25.4 percent).

The resin solution was applied by roll coating on tin plate and the film was cured for 10 minutes at 380° F. The resultant plasticized film was hard, tack-free and resistant to acetone. It had good toughness and flexibility and the tin plate could easily be fabricated. The film was found to be free of objectionable taste imparting properties when tested with bland foods in heat-processing and was resistant to the action of fatty foods when processed at 250° F. for 2 hours. The film exhibited substantially no spangling.

EXAMPLE VII

The following example illustrates plasticization of the same phenolic resin utilized in Example VI. In this example a mixture of compatible plasticizers was used:

Solution A 4 parts polyvinyl butyral resin
18 parts butanol
18 parts xylene
_____
40 parts of 10 percent solids solution

Solution B 130 parts alkenylphenol-aldehyde resin solution at 63 percent cured resin solids content

Solution C 37 parts of a copolymer solution (M viscosity) which contained 38 percent solids in xylene of a copolymer obtained from maleated linseed oil polymerized with styrene and acrylamide.

The three solutions were interblended to give 207 parts of a mixture containing 48.3 percent total solids (the phenolic resin being calculated on its cured resin solids content of 63 percent). The composition of the resins in this blend was as follows:

| | Percent |
|---|---|
| Phenolic resin (as cured solids) | 82 |
| Butyral resin | 4 |
| Copolymer resin | 14 |

The above solution at 48.3 percent solids was adjusted to 38 seconds viscosity in a No. 2 Zahn cup by the addition of 23 parts of methylisobutyl ketone to give satisfactory roller coat application. At this reduction, the solids were 43.5 percent and the composition of the solvent mixture was as follows:

| | Percent |
|---|---|
| Butanol | 47 |
| Xylene | 34 |
| Methylisobutyl ketone | 19 |

The use of the above mixed plasticizer composition permits application at higher total solids content, since the copolymer solution is lower in viscosity than the butyral resin solution. Films on tin plate and black iron plate were cured for 8 minutes at 400° F. and were found to be equivalent to the cured films of Example VI.

EXAMPLE VIII

A mixed butenylphenol-formaldehyde resin was prepared as in Example I and the final resin was obtained as a solvent-free composition. It had a viscosity of $Z_2$ and contained 87.4 percent solids at 110° C. and 83 percent solids at 400° F., the losses in each case representing the loss in weight during cure to those temperatures.

This resin was formulated with polyvinylbutyral to a composition containing 85 percent phenolic resin (as cured solids) and 15 percent polyvinylbutyral resin. When dissolved in a solvent containing 45 percent butanol, 45 percent xylene and 10 percent diacetone alcohol, a roll-coating solution was obtained at 29 percent total solids. Films of this resin were prepared by roller coating onto tin plate, black iron plate and chemically treated steel plate, and were cured for 10 minutes at 400° F. These films were similar to those of the preceding examples and showed extremely good resistance in alkaline immersion tests.

EXAMPLE IX

One hundred parts of a 15 percent solids solution of polyvinylformal in diacetone alcohol, 129 parts of a butenylphenol-aldehyde resin solution (66 percent cured resin solids with butanol as the solvent) and 150 parts of diacetone alcohol was admixed to form 379 parts of a solution containing 100 parts (26.4 percent) resin solids. The resin composition was 85 percent cured phenolic solids and 15 percent polyvinylformal solids, and the solvent contained 14.1 percent butanol and 85.9 percent diacetone alcohol. The use of a high proportion of solvent such as diacetone alcohol was required because of the difficult solubility of the polyvinylformal resin. Films of this blend were prepared and cured for 10 minutes at 400° F. The films were extremely hard and alkali and acetone resistant, although they were more brittle than the corresponding resins plasticized with polyvinylbutyral.

EXAMPLE X

This example illustrates that the amount of polyvinylacetal resin utilized in combination with alkenylphenol-aldehyde resins should be maintained within the range of about 10 percent to 35 percent by weight based on the phenolic resin solids in order consistently to obtain good results and substantial freedom from spangling.

A series of panels was coated with various blends of butenylphenol-formaldehyde resins with polyvinylbutyral resins. The butenylphenol-formaldehyde resin was prepared from a mixture of o- and p-mono-, di- and tributenylphenols and had a total solids content of 70 percent, a Gardner viscosity of G and a weight per gallon of 8.3 pounds. The polyvinylbutyral resin utilized was XYHL, a product of the Bakelite Division of Carbide & Carbon Chemicals Corporation. Electrolytic tin plate panels were utilized.

One panel, designated "A," was coated with a blend of 90 parts of the butenylphenol-formaldehyde resin and 10 parts of the polyvinylbutyral resin; a second panel, designated "B," was coated with a blend of 75 parts of the butenylphenol-formaldehyde resin and 25 parts of the polyvinylbutyral resin; and a third panel, designated "C," was coated with a blend of 50 parts of the butenylphenol-formaldehyde resin and 50 parts of the polyvinylbutyral resin. Each of the panels was coated to a thickness of 20 mgm./4 sq. in. and baked at 400° F. for 10 minutes. The panels were then heated for an additional 90 minutes in dog food (predominantly horse meat) at a temperature of 250° F. (a conventional meat processing temperature) and then examined visually for defects. Panels A and B, containing 10 parts and 25 parts by weight of the polyvinylbutyral resin, respectively, showed substantially no spangling, whereas panel C exhibited a very substantial amount of spangling, so much, in fact, that the composition utilized on panel C would be practically useless as a food container coating.

When the above examples are repeated using resins prepared from other alkenylphenols selected from those disclosed hereinabove, or from resins in which the aldehyde component is an aldehyde other than formaldehyde, for example, such as those utilized in Example IV, useful compositions are obtained. Also, when other plasticizing amounts of polyvinylacetal resins are utilized, compositions are obtained which form useful films.

From the foregoing description of the invention it will be seen that the alkenylphenol-aldehyde resins plasticized with polyvinylacetal resins in accordance with the present invention constitute a new and useful class of resinous compositions. It is apparent, therefore, that various embodiments of the invention, in addition to those specifically disclosed, may be provided without departing from the spirit and scope of the invention as defined in the appended claims.

This application is a continuation-in-part of copending application, Serial No. 396,342, filed December 4, 1953, now abandoned.

We claim:

1. A composition comprising the resinous condensation product of a mixture of butenylphenols and an aldehyde containing only atoms of carbon, hydrogen, and oxygen, and as a plasticizer therefor, from about 10 percent to about 35 percent by weight of a polyvinylacetal resin selected from the class consisting of polyvinylbutyral and polyvinylformal resins, based on the solids of said resinous condensation product.

2. A composition comprising the resinous condensation product of a mixture of butenylphenols and formaldehyde, and as a plasticizer therefor, from about 10 percent to about 35 percent by weight of a polyvinylacetal resin selected from the class consisting of polyvinylbutyral and polyvinylformal resins, based on the solids of said resinous condensation product.

3. The composition of claim 2 wherein the polyvinylacetal resin is polyvinylbutyral.

4. The composition of claim 3 wherein the mixture of alkenylphenols includes from about 55 percent to 85 percent monobutenylphenols, and from about 15 percent to 45 percent di- and tributenylphenols.

5. A composition particularly useful as a coating on the interior surfaces of containers for food products without being subject to significant spangling, which comprises the base catalyzed resinous condensation product of a mixture of butenylphenols containing from about 55 percent to 85 percent by weight of monobutenylphenols and about 15 percent to 45 percent of di- and tributenylphenols and formaldehyde, and as a plasticizer therefor, from about 10 percent to about 25 percent by weight of polyvinylbutyral, based on the solids content of the resinous condensation product.

6. A metallic surface coated with a heat hardened film of the composition of claim 1.

7. A metallic surface coated with a heat hardened film of the composition of claim 5.

References Cited in the file of this patent

UNITED STATES PATENTS

| | | |
|---|---|---|
| 2,006,043 | Dykstra | June 25, 1935 |
| 2,307,588 | Jackson et al. | Jan. 5, 1943 |
| 2,336,792 | Langkammerer et al. | Dec. 14, 1943 |
| 2,587,578 | Jones | Mar. 4, 1952 |
| 2,843,566 | Christenson et al. | July 15, 1958 |